United States Patent
Halder et al.

(10) Patent No.: US 12,229,174 B1
(45) Date of Patent: Feb. 18, 2025

(54) METHOD AND SYSTEM OF OPTIMIZING QUERY INPUT FOR GENERATING CODES USING LARGE LANGUAGE MODELS

(71) Applicant: L&T TECHNOLOGY SERVICES LIMITED, Chennai (IN)

(72) Inventors: Kaushik Halder, Chennai (IN); Basha Mohamed, Chennai (IN); Krishna Priya Reghunathan Pillai, Kollam (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 18/644,213

(22) Filed: Apr. 24, 2024

(30) Foreign Application Priority Data

Mar. 7, 2024 (IN) .............................. 202441017178

(51) Int. Cl.
G06F 16/00 (2019.01)

(52) U.S. Cl.
CPC ................................ G06F 16/3331 (2019.01)

(58) Field of Classification Search
CPC .................................................. G06F 16/3331
See application file for complete search history.

(56) References Cited

U.S. PATENT DOCUMENTS

| | | | |
|---|---|---|---|
| 11,983,494 B1* | 5/2024 | Watkins | ................ G06F 40/279 |
| 2023/0237277 A1 | 7/2023 | Reza et al. | |
| 2023/0342392 A1 | 10/2023 | McCarson | |
| 2023/0359902 A1 | 11/2023 | Cefalu et al. | |

FOREIGN PATENT DOCUMENTS

| | | |
|---|---|---|
| CN | 116820429 A | 9/2023 |
| CN | 116910202 A | 10/2023 |
| CN | 116991391 A | 11/2023 |

OTHER PUBLICATIONS

Shanglun Wang; Improving Chatbot With Code Generation: Building a Context-Aware Chatbot for Publications; Hackernoon; Nov. 6, 2023.

(Continued)

*Primary Examiner* — Ajith Jacob
(74) *Attorney, Agent, or Firm* — Kendal M. Sheets

(57) ABSTRACT

A method and system of optimizing query input for generating a set of code using a large language model (LLM), is disclosed. A processor receives a user query input by a user for querying the LLM to generate the set of code corresponding to a user-defined coding language. A set of primitive queries are determined from the user query based on the predefined keyword reference table and using an NLP model. Metadata is determined from the set of primitive queries. A query type is determined from a set of predefined query types of the user query using a machine learning model. An optimized query is determined based on the query type and the metadata using the NLP model and a historical database. The set of code is determined corresponding to the user-defined coding language based on the query type and the optimized query by querying the LLM.

20 Claims, 4 Drawing Sheets

(56) References Cited

OTHER PUBLICATIONS

Majeed Kazemitabaar, Xinying Hou, Austin Henley, Barbara J. Ericson, David Weintrop, Tovi Grossman; How Novices Use LLM-Based Code Generators to Solve CS1 Coding Tasks in a Self-Paced Learning Environment; arXiv; Sep. 25, 2023; Finalnd.

Meng Chen, Hongyu Zhang, Chengcheng Wan, Zhao Wei, Yong Xu, Juhong Wang, Xiaodong Gu; On the Effectiveness of Large Language Models in Domain-Specific Code Generation; arXiv; Mar. 12, 2024.

Giulio Alessandrini, Timothée Verdier, Christopher Wolfram, Bob Sandheinrich; Wolfram/LLMFunctions; p. 1-6.

Disha Shrivastava, Hugo Larochelle, Daniel Tarlow; Repository-Level Prompt Generation for Large Language Models of Code; Jun. 26, 2022; V3; arXiv; Cornell University.

\* cited by examiner

METHOD AND SYSTEM OF OPTIMIZING QUERY INPUT FOR GENERATING CODES USING LARGE LANGUAGE MODELS

TECHNICAL FIELD

This disclosure relates generally to method of querying or prompting large language models (LLMs) and more particularly to a method and system of optimizing query input for generating codes using large language models.

BACKGROUND

Prompting or querying is referred to providing an initial input or query to a Large Language Model (LLM) in order for the LLM to generate a desired response. Users or developers input a specific prompt, question, or instruction based on which the LLM outputs a response. The way a prompt is phrased can influence the output generated by the LLM, making it an essential aspect of interacting with LLMs. LLMs are often utilized to generate programming codes, however, a poorly phrased prompt can yield unhelpful and non-consistent programming codes as output. Writing programming code that is short, crisp and devoid of redundancy has historically been a time-consuming process for developers, often taking anywhere from a few hours to a week. Additionally, making coding more inaccessible to a wider audience, hindering efforts to bridge the skills gap and involve a more diverse group of individuals in programming. Consistency in code development poses another challenge, as each developer tends to employ their own unique patterns and approaches, leading to potential difficulties in maintenance and troubleshooting. Human errors in coding further exacerbate the issue, potentially resulting in unreliable code that can lead to system failures and malfunctions. Generating PLC code for Structured Text Language (STL) and Ladder Logic introduces additional complexities due to factors such as complex statements, compound statements, and non-standardized data. These difficulties make the task of developing PLC code for these languages challenging, requiring a careful approach to ensure accurate and reliable outcomes.

Therefore, there is a requirement for an efficient and effective methodology for optimizing query input for generating codes using LLMs.

SUMMARY OF THE INVENTION

In an embodiment, a method for optimizing query input for generating a set of code using a large language model (LLM) is disclosed. The method may include receiving, by a processor, a user query input by a user for querying the LLM to generate the set of code corresponding to a user-defined coding language. The method may further include determining, by the processor, a set of primitive queries from the user query using an NLP model. In an embodiment, the set of primitive queries may be determined by determining at least one of: a compound phrase and/or a complex phrase in the user query. In an embodiment, the set of primitive queries may be further determined by determining, one or more of: a set of input keywords, a set of conditional keywords and a set of output keywords. The method may further include determining, by the processor, metadata from the set of primitive queries. In an embodiment, the metadata comprises a number of input keywords in the set of input keywords, a number of conditional keywords in the set of conditional keywords, a number of lines of code, and/or a number of for loops. The method may further include determining, by the processor, a query type from a set of predefined query types of the user query using a machine learning model. In an embodiment, the machine learning model may be trained to classify the user query as one of the set of predefined query types. The method may further include optimizing, by the processor, the set of primitive queries to determine an optimized query based on the query type and the metadata using the NLP model and a historical database. In an embodiment, the historical database may include a plurality of historical query-outputs corresponding to each of a plurality of historical queries and corresponding metadata of the plurality of historical query-outputs and the plurality of historical queries. The method may further include determining, by the processor, the set of code corresponding to the user-defined coding language based on the query type and the optimized query by querying the LLM.

In another embodiment, a system of optimizing query input for generating a set of code using a large language model (LLM) is disclosed. The system may include a processor, a memory communicably coupled to the processor, wherein the memory may store processor-executable instructions, which when executed by the processor may cause the processor to receive a user query input by a user for querying the LLM to generate the set of code corresponding to a user-defined coding language. The processor may further determine a set of primitive queries from the user query using an NLP model. In an embodiment, to determine the set of primitive queries, the processor may determine at least one of: a compound phrase and/or a complex phrase in the user query. Further, in order to determine the set of primitive queries, the processor may further determine one or more of a set of input keywords, a set of conditional keywords and a set of output keywords. The processor may further determine metadata from the set of primitive queries. In an embodiment, the metadata may include a number of input keywords in the set of input keywords, a number of conditional keywords in the set of conditional keywords, a number of lines of code, and/or a number of for loops. The processor may further determine a query type from a set of predefined query types of the user query using a machine leaning model. In an embodiment, the machine learning model may be trained to classify the user query as one of the set of predefined query types. The processor may further optimize the set of primitive queries to determine an optimized query based on the query type and the metadata using the NLP model and a historical database. In an embodiment, the historical database comprises a plurality of historical query-outputs corresponding to each of a plurality of historical queries and corresponding metadata of the plurality of historical query-outputs and the plurality of historical queries. The processor may further determine the set of code corresponding to the user-defined coding language based on the query type and the optimized query by querying the LLM.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Creating functional code that meets specific requirements can be challenging because developers need to balance accuracy and consistency while also minimizing the time it takes to write the code. When it comes to developing Programmable Logic Controller (PLC) codes used for controlling processes in industries, it is essential to have a consistent code for easy debugging and understanding.

PLC code for Structured Text Language (STL) and ladder logic generated using LLM can be complex due to factors like complicated statements, compound statements, and non-standardized keywords. To understand this complexity, let's consider an example problem statement: "If the water level is below a certain user-defined threshold, then the four pumps should stop, and the input pump should start filling the deposit."

This problem statement is complex because it involves multiple conditions. For instance, the phrase "initiate filling the deposit" implies turning on a pump. However, it's non-standard because it lacks standard terminology, such as "start/stop" or "on/off," making it easier for the computer to understand the instruction. Additionally, it's a compound statement since it combines two individual statements using the conjunction "and." The two individual statements are: 1) "If the water level is below a certain user-defined threshold, then the four pumps should stop" and 2) "the input pump should initiate filling the deposit." Accordingly, the present disclosure provides a method and system for optimizing query input for generating codes using large language models (LLMs).

Figure 1:
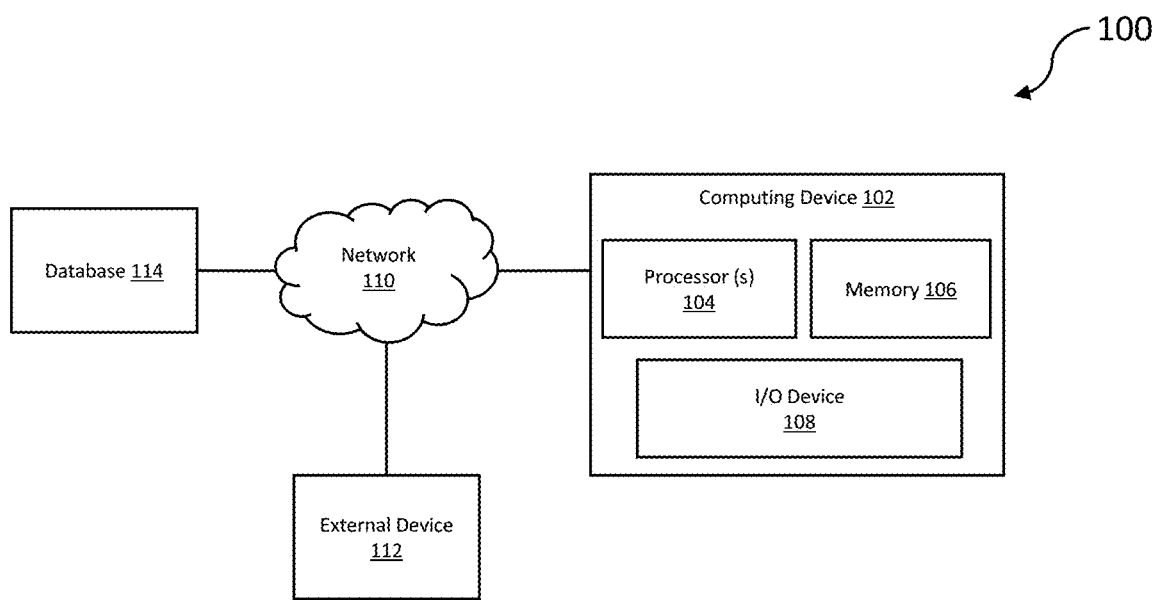
FIG. 1 illustrates a block diagram of an exemplary query optimization system for optimizing query input for generating codes using large language models, in accordance with an embodiment of the present disclosure.

Referring now to FIG. 1, a block diagram of an exemplary query optimization system 100 for optimizing query input for generating codes using large language models is illustrated, in accordance with an embodiment of the present disclosure. The query optimization system 100 may include a computing device 102, an external device 112, and a database 114 communicably coupled to each other through a wired or wireless communication network 110. The computing device 102 may include a processor 104, a memory 106 and an input/output (I/O) device 108.

In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors.

In an embodiment, the memory 106 may store instructions that, when executed by the processor 104, and cause the processor 104 to optimize query input for generating codes using LLMs, as discussed in more detail below. In an embodiment, the memory 106 may be a non-volatile memory or a volatile memory. Examples of non-volatile memory may include but are not limited to, a flash memory, a Read Only Memory (ROM), a Programmable ROM (PROM), Erasable PROM (EPROM), and Electrically EPROM (EEPROM) memory. Further, examples of volatile memory may include but are not limited to, Dynamic Random Access Memory (DRAM), and Static Random-Access memory (SRAM).

In an embodiment, the I/O device 108 may comprise of variety of interface(s), for example, interfaces for data input and output devices, and the like. The I/O device 108 may facilitate inputting of instructions by a user communicating with the computing device 102. In an embodiment, the I/O device 108 may be wirelessly connected to the computing device 102 through wireless network interfaces such as Bluetooth®, infrared, or any other wireless radio communication known in the art. In an embodiment, the I/O device 108 may be connected to a communication pathway for one or more components of the computing device 102 to facilitate the transmission of inputted instructions and output results of data generated by various components such as, but not limited to, processor(s) 104 and memory 106.

In an embodiment, the database 114 may be enabled in a cloud or a physical database and may store historical data, and training data. In an embodiment, the training data may include data that may be used to train the various machine learning (ML) models such as, natural language processing (NLP) models, etc. In an embodiment, the database 114 may store data input by an external device 112 or output generated by the computing device 102.

In an embodiment, the communication network 110 may be a wired or a wireless network or a combination thereof. The network 110 can be implemented as one of the different types of networks, such as but not limited to, ethernet IP network, intranet, local area network (LAN), wide area network (WAN), the internet, Wi-Fi, LTE network, CDMA network, 5G and the like. Further, network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 110 can include a variety of network devices, including routers, bridges, servers, computing devices, storage devices, and the like.

In an embodiment, the computing device 102 may receive a prompt or a user query to be input as a prompt to a large learning model (LLM) for generating codes using LLM from an external device 112 through the network 110. In an embodiment, the computing device 102 and the external device 112 may be a computing system, including but not limited to, a smart phone, a laptop computer, a desktop computer, a notebook, a workstation, a portable computer, a handheld, a scanner, or a mobile device. In an embodiment, the computing device 102 may be, but not limited to, in-built into the external device 112 or may be a standalone computing device.

In an embodiment, the computing device 102 may perform various processing in order to optimize query input for generating a set of code using an LLM. By way of an example, the computing device 102 may receive a user query input by a user for querying the LLM to generate the set of code corresponding to a user-defined coding language. In an embodiment, the user query may be, but is not limited to, in a form of a statement that may define a generic problem statement and output requirement. In an embodiment, examples of the LLM may include, but are not limited to, zephyr, code LLAMA, GPT, etc.

Further, the computing device 102 may preprocess the user query by determining one or more noise phrases in the user query based on a predefined keyword reference table. In an embodiment, the predefined keyword reference table may include a set of noise phrases and a corresponding reference phrase. Further, to preprocess the user query the computing device 102 may replace the one or more noise phases in the user query with a corresponding reference phases based on a lookup of each of the one or more noise phrases in the predefined keyword reference table.

The computing device 102 may further determine a set of primitive queries from the user query that may have been preprocessed, using an NLP model. In an embodiment, examples of the NLP model may include, but are not limited to, XLNet, enhanced representation through knowledge integration (ERNIE), generative pretrained transformer (GPT), etc.

In an embodiment, to determine the set of primitive queries, the computing device 102 may determine at least one of a compound phrase and/or a complex phrase in the user query. In an exemplary embodiment, the complex phrase may combine a plurality of sentences of the user query.

Further, in order to determine the set of primitive queries, the computing device 102 may further determine one or more of a set of input keywords, a set of conditional keywords and a set of output keywords. The computing device 102 may further determine an input value corresponding to each input keyword of the set of input keywords. The computing device 102 may further determine the user query as invalid in case the input value corresponding to at least one input keyword of the set of input keywords may be undefined. The computing device 102 may further display an alert based on the determination of the user query as invalid. The computing device 102 may further receive an updated input value of the at least one input keyword that may have the input value as undefined from the user.

Further, the determination of the set of primitive queries may include standardizing, by the computing device 102 one or more of the set of input keywords, the set of conditional keywords and the set of output keywords based on the predefined keyword reference table. In an embodiment, the standardization may be based on a look up of each word or phrase of the user query in the predefined keyword reference table to replace with standard phrases. In an embodiment, the standard phrases may be defined based on domain or programming language. In an exemplary embodiment, the standardization may include, but is not limited to, replacing of "start/on/engaging/etc." to "ON" to simplify the complex phrase and/or the compound phrase, simplifying literature of the one or more of the set of input keywords.

Further, the computing device 102 may determine metadata from the set of primitive queries. In an embodiment, the metadata may include, but is not limited to, a number of input keywords in the set of input keywords, a number of conditional keywords in the set of conditional keywords, etc.

Further, the computing device 102 may determine a query type from a set of predefined query types of the user query using a machine learning model. In an embodiment, the machine learning model may be trained to classify the user query as one of the set of predefined query types. In an embodiment, the set of predefined query types may include, but are not limited to, generated knowledge prompting, chain of thoughts, priming, etc. In an embodiment, the machine learning model may be, but not limited to, a classification model. In an embodiment, the classification model may include, but is not limited to, decision trees, random forest, K-nearest neighbors (KNN), support vector machines (SVM), etc.

Further, the computing device 102 may optimize the set of primitive queries to determine an optimized query based on the query type and the metadata using the NLP model and a historical database. In an embodiment, the historical database may include a plurality of historical query-outputs corresponding to each of a plurality of historical queries and corresponding metadata of the plurality of historical query-outputs and the plurality of historical queries. In an embodiment, the optimized query based on the query type may be determined based on performing an action related to the query type. In an exemplary embodiment, if in case the query type may be determined as the generated knowledge, then the action related to the generated knowledge may be to generate knowledge from a language model, then providing the knowledge as additional input to the LLM when the LLM may be generating code based on the optimized query.

In an exemplary embodiment, if in case the query type may be determined as priming then action related to the priming may be to set an initial context or providing prior instructions to the LLM to influence its output at a preliminary stage. By setting the preliminary stage, the LLM may get a direction, which may guide its responses and overall interaction.

Accordingly, the computing device 102 may determine the set of code corresponding to the user-defined coding language based on the query type and the optimized query by querying the LLM. Further, the computing device 102 may determine metadata from the set of code determined. In an embodiment, the metadata may include, but is not limited to, a number of lines of code, and/or a number of for loops, etc.

Further, the computing device 102 may receive a user feedback for the set of code output by the LLM based on the querying of the LLM. In an embodiment, the user feedback may include a rating and/or an updated set of code input by the user corresponding to the set of code output by the LLM. Accordingly, the computing device 102 may tune the LLM based on the rating and/or the updated set of code corresponding to the set of code output by the LLM and the optimized query.

Further, the computing device 102 may update a historical database based on the set of code output by the LLM in case the rating may be above a predefined threshold or the updated set of code input by the user for the user query and the optimized query. In an embodiment, the database 114 may include the historical database that may store historical data. In an embodiment, the historical data may include the set of codes, and historical query-outputs to the historical user queries and optimized queries. In an embodiment, the database 114 may be interchangeably known as a historical database 114.

In an embodiment, the computing device 102, after receiving the user query may determine if the user query is present in the historical database 114 by comparing the preprocessed user query input with the historical data saved in the historical database 114.

In an embodiment, the computing device 102 may determine the set of code corresponding to the user query based on the historical data, if in case there is a match between the preprocessed user query and the historical user queries saved in the historical database 114.

Figure 2:
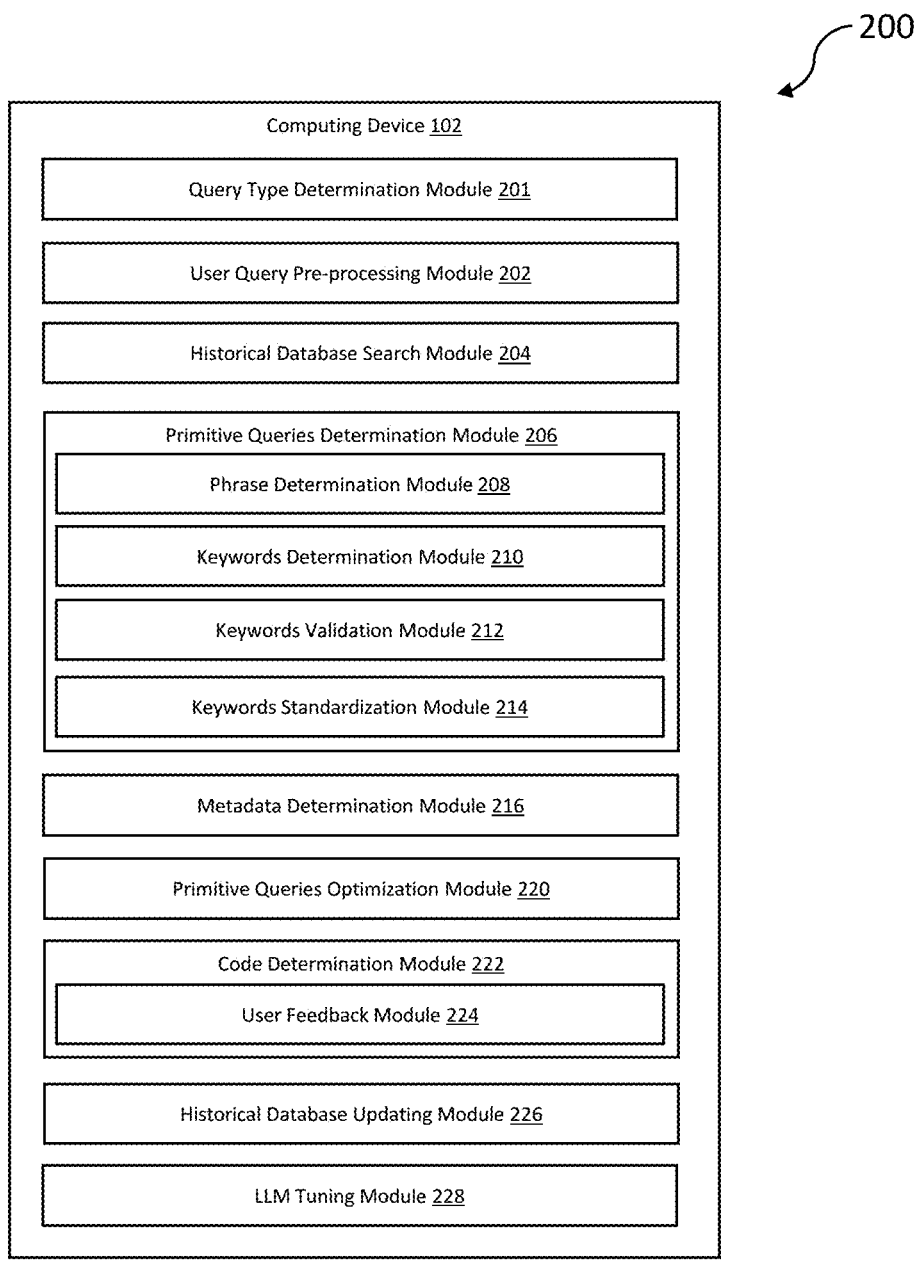
FIG. 2 illustrates a functional block diagram of a computing device, in accordance with an embodiment of the present disclosure.

Referring now to FIG. 2, a functional block diagram of the computing device 102 is illustrated, in accordance with an embodiment of the present disclosure. In an embodiment, the computing device 102 may receive a user query input by a user for querying the LLM to generate the set of code corresponding to a user-defined coding language. In an embodiment, the user query may be, but is not limited to, in a form of statement that may define a generic problem statement and output requirements. In an embodiment, examples of the LLM may include, but are not limited to, zephyr, code LLAMA, GPT, etc. In an embodiment, user-defined coding languages may include, but not limited to Python, JavaScript, Go, Perl, SQL, etc.

In an embodiment, the computing device 102 may include a query type determination module 201, a user query pre-processing module 202, a historical database search module 204, a primitive queries determination module 206, a meta-data determination module 216, a primitive queries optimization module 220, a code determination module 222, a LLM tuning module 226, a historical database updating module 228.

In an exemplary embodiment, if in case the user query is directly input to the LLM, to determine the set of codes, the code determination module may not be unable to generate a code in the user-defined coding language. In an embodiment, the user query may be, to generate a PLC code for an exemplary user query "5 diverts, the PLC gets a message from a 3$^{rd}$ party device that the product needs to divert to number 3 divert. Track the product and divert it to number 3. The conveyor is running using a motor which is just transporting the product. There are sensors before every divert and there are pop up wheels to move the product into the divert direction wherever necessary." LLM may determine a STL code and may not be able to generate a C language code. Accordingly, the STL code may not be useful.

Therefore, there is a requirement to specify a coding language as user-defined coding language along with the prompt or user query in order to generate a code using the syntax of the user-defined coding language.

The query type determination module 201 may determine a query type from a set of predefined query types of the user query using a machine learning model. In an embodiment, the machine learning model may be trained to classify the user query as one of the set of predefined query types. In an embodiment, the set of predefined query types may include, but are not limited to, generated knowledge prompting, chain of thoughts, and priming. In an embodiment, the machine learning model may be a classification model. In an embodiment, the classification model may include, but is not limited to, decision trees, random forest, K-nearest neighbors (KNN), support vector machines (SVM), etc.

The user query pre-processing module 202 may preprocess the user query by determining one or more noise phrases in the user query based on a predefined keyword reference table. In an embodiment, the predefined keyword reference table may include a set of noise phrases and a corresponding reference phrase. Further, to preprocess the user query the user query pre-processing module 202 may replace the one or more noise phases in the user query with a corresponding reference phases based on a lookup of each of the one or more noise phrases in the predefined keyword reference table.

The historical database search module 204 may determine if the preprocessed user query matches with any of the historical queries saved as historical data in the historical database 114. In an embodiment, the preprocessed user query may be compared with the each of the historical queries in the historical database 114. Further, a matching percentage may be determined between the preprocessed user query and each of the historical queries. In case the matching percentage for a particular historical query is determined to be above predefined threshold such as, but not limited to, 95% above, then historical code generated by the LLM for that particular historical query may be output to the user.

Further, the set of code corresponding to the preprocessed user query determined based on the historical database 114 may ensure consistency in the code determined. In an embodiment, the determination of the set of code may be based on one or more dimensions. In an exemplary embodiment, the one or more dimensions may include, but is not limited to, if the historical set of code has good rating based on a user feedback.

Further, in case there is no match found for the preprocessed user query in the historical database 114, the primitive queries determination module 206 may determine a set of primitive queries from the preprocessed user query using an NLP model. In an embodiment, examples of the NLP model may include, but are not limited to, XLNet, enhanced representation through knowledge integration (ERNIE), generative pretrained transformer (GPT), etc. In an embodiment, the primitive queries determination module 206 may sub-include a phrase determination module 208, a keywords determination module 210, a keywords validation module 212, a keywords standardization module 214.

In an embodiment, to determine the set of primitive queries, the phrase determination module 208 may determine a compound phrase and/or a complex phrase in the user query. In an exemplary embodiment, the complex phrase may combine a plurality of sentences of the user query. An example of a user query including a complex phrase can be, "The railway gate closes once switch is ON and vice versa." wherein "vice versa", may be the complex phrase that may state the opposite of statement is true as well. In another exemplary embodiment, the compound phrase may be, but is not limited to, "when red switch is ON then light is ON and when green switch is ON then fan is ON."

Further, in order to determine the set of primitive queries, the keyword determination module 210 may determine one or more of a set of input keywords, a set of conditional keywords and a set of output keywords. In an embodiment, the input keywords may be determined from the user query for which a value may be defined. In an embodiment, the output keywords may be determined from the user query for which a value is required to be determined. Further, the conditional keywords may be determined from the user query as operators that may be used to process the values associated to the input keywords in order to determine the value of output keywords. Further, the keyword validation module 212 may determine an input value corresponding to each input keyword of the set of input keywords determined from the user query. The keyword validation module 212 may further determine the user query as invalid in case an input value corresponding to at least one input keyword of the set of input keywords may be undefined. The keyword validation module 212 may further display an alert based on the determination of the user query as invalid. The keyword validation module 212 may further receive from the user an updated input value of the at least one input keyword that may have the input value as undefined.

Further, the keywords standardization module 214 may standardize one or more of the set of input keywords, the set of conditional keywords and the set of output keywords based on the predefined keyword reference table. In an embodiment, the standardization may be up to an extent at domain or organization level. In an exemplary embodiment, the standardization may include, but is not limited to, replacing of "start/on/engaging/etc." with "ON" to simplify the complex phrase and/or the compound phrase, simplifying and standardizing terminology of the one or more of the set of input keywords.

Further, the metadata determination module 216 may determine metadata from the set of primitive queries. In an embodiment, the metadata may include, but is not limited to, a number of input keywords in the set of input keywords, a number of conditional keywords in the set of conditional keywords, etc.

Further, the primitive queries optimization module 220 may optimize the set of primitive queries to determine an optimized query based on the query type and the metadata using the NLP model and a historical database 114. In an embodiment, the historical database may include a plurality of historical query-outputs corresponding to each of a plurality of historical queries and corresponding metadata of the plurality of historical query-outputs and the plurality of historical queries. In an embodiment, the historical query-output may be output generated by the LLM in response to a corresponding historical query and or received as a feedback from the user.

In an embodiment, the optimized query based on the query type may be determined by performing an action related to the query type. In an exemplary embodiment, if in case the query type may be determined as the generated knowledge, then the action related to the generated knowledge may be to generate knowledge from a language model, then providing the knowledge as additional input to the LLM when the LLM may be generating code based on the optimized query. In an exemplary embodiment, if in case the query type may be determined as priming then action related to the priming may be to set an initial context or providing prior instructions to the LLM to influence its output at a preliminary stage. By setting the preliminary stage, the LLM may get a direction, which may guide its responses and overall interaction.

Further, the code determination module 222 may enable LLM to determine the set of code corresponding to the user-defined coding language based on the query type and the optimized query by querying the LLM. Accordingly, the LLM may perform the action as per the query type determined, to determine the set of code corresponding to the user-defined coding language.

Further, the metadata determination module 216 may determine metadata from the set of code determined. In an embodiment, the metadata may include, but is not limited to, a number of lines of code, and/or a number of for loops. In an embodiment, the code determination module 222 may sub-include a user feedback module 224. The user feedback module 224 may receive a user feedback for the set of code output by the LLM based on the querying or prompting of the LLM.

The code determination module 222 may determine the set of codes based on the optimized query and the query type using the LLM. In an exemplary embodiment, in case of the user-defined programing language is PLC, the set of input keywords may be denoted as PLC_input, the set of conditional keywords may be denoted as PLC_Condition and, the set of output keywords may be denoted as PLC_output. In an embodiment, the PLC_output may be an expected output based on the processing of the PLC_input as per the PLC_Condition.

Further, in accordance with the exemplary embodiment, the user query may include, "In industry a lot of production lines require a sequential activation for its machines, especially when producing a product conveyed from one machine to another in a sequence. This product could be a chemical, seed processing, or any kind of processing. Having multiple large motors activated at the same time will cause a very high inrush current on the factory circuit breaker, meaning it's not a good idea to give a start button and all the line is turned on at the same time. A sequence activator needs to be programmed. Oh well we won't be programming ANY sequence activator. We want one that can be easily modified, meaning if the clients want to add 20 new machines to the sequence, all it should take is changing the number of machines in your code in it and should be enough to adapt for the new production line. Overview: You have 5 machines each with one motor, the end of the production line is a storage Silo or container. Every motor has a feedback overload signal."

According to the exemplary PLC_input, the PLC_Condition as determined by the keywords determination module 210 may be as given below:

1. Giving a start signal should activate all the motors in sequence starting from motor 1 ending with 5 (Wait time in-between)
2. If any motor in the sequence is facing an overload fault, all motors should halt no matter what's the sequence activation status
3. The operator should press Reset Fault: Before being able to activate the sequence again after a fault
4. The operator should also be able to issue General Stop to halt the whole production line.

Further, according to the exemplary embodiment, the PLC_output, as determined by the keywords determination module 210 may be as given below:

1. Use a class to create your motor
2. Use Structures for Inputs and Outputs
3. Utilize for loops and if statements (FSM is optional)
4. Every motor should have an Input of type (TIME) to decide when to activate the next motor in the sequence
5. This Time shouldn't be hard-coded, meaning the operator should be able to specify it."

Further, the primitive queries determination module 206 may determine a set of primitive queries based on the PLC_Input, the PLC_Condition, PLC_Output. Further, the query type may be determined. The PLC_code that may be generated by the code determination module 222 may be as given below:

```
FUNCTION_BLOCK Motor
  VAR_INPUT
    startSignal: BOOL; // input signal to start the motor
    timeDelay: TIME; // input signal to specify the delay
      before activating the next motor
    resetFaultSignal: BOOL; // input signal to reset a
      fault
  END_VAR
  VAR_OUTPUT
    motorOn: BOOL; // output signal indicating if the
      motor is on
    overloadFault: BOOL; // output signal indicating if
      the motor is facing an overload fault
  END_VAR
  VAR
    timer: TON; // timer to delay activation of the next
      motor
    fault: BOOL:=FALSE; // internal fault signal
  END_VAR
    STATE
    IF resetFaultSignal THEN
      fault:=FALSE;
    END_IF
CASE state OF
0: // motor is off
motorOn:=FALSE;
overloadFault:=FALSE;
IF startSignal THEN
  state:=1;
END_IF 1: // motor is starting
IF NOT timer (IN:=TRUE, PT:=timeDelay) THEN
  motorOn:=TRUE;
    state:=2;
END_IF 2: // motor is running
IF overloadFault THEN
fault:=TRUE;
state:=0;
END_IF
END_CASE
IF fault THEN
motorOn:=FALSE;
overloadFault:=TRUE;
END_IF
END_STATE
END_FUNCTION_BLOCK
PROGRAM Main
VAR
motors: ARRAY [1 . . . 5] OF Motor; // array of 5 motors
startSignal: BOOL:=FALSE; // input signal to start the
  sequence
resetFaultSignal: BOOL:=FALSE; // input signal to reset
  a fault
generalStopSignal: BOOL:=FALSE; // input signal to
  stop the sequence
timeDelays: ARRAY [1 . . . 5] OF TIME:=[t #1s, t #2s, t
  #3s, t #4s, t #5s]; // array of time delays for each motor
END_VAR
STATE
FOR i:=1 TO 5 DO
motors [i] (startSignal:=startSignal AND (i=1 OR motors
  [i−1].timer.Q), // start the motor only if the previous
  motor's timer has elapsed
timeDelay:=timeDelays [i], resetFaultSignal:=resetFault-
  Signal); // set the time delay and reset
fault signal for each motor
END_FOR
  IF generalStopSignal THEN // stop all motors if general
    stop signal is received
    FOR i:=1 TO 5 DO
      motors [i].motorOn:=FALSE;
    END_FOR
  END_IF
  // reset fault signal
  IF resetFaultSignal THEN
    FOR i:=1 TO 5 DO
      motors [i].overloadFault:=FALSE;
    END_FOR
  END_IF
  END_STATE
  END_PROG
```

In an exemplary embodiment, based on the query type the LLM may determine the above-mentioned code by defining a motor function block that represents a single motor with inputs for starting the motor, specifying a time delay, and resetting a fault, and outputs for indicating if the motor is on and if it is facing an overload fault. The main program initializes an array of 5 Motor function blocks and sets the start signal and time delays for each motor. It then runs a loop that starts each motor in sequence with a delay between them and stops all motors if a general stop signal is received. Finally, it resets any faults if a reset fault signal is received.

Further, the user feedback module 224 may receive a user feedback to the set of code output by the LLM based on the querying of the LLM. In an embodiment, the user feedback module 224 may include a feedback table. In an embodiment, the set of code may be rated by the user based on the user feedback. If in case the set of code may be rated as 4 or above on a scale of 0-5 with 0 being poor and 5 being good, the set of code, the user query input, and the user feedback may be stored in the historical database 114. However, if in case the set of code is rated below 3 or below, the user may input an updated set of code that may be then saved in the historical database 114. In an embodiment, the updated set of code along with the user query, the optimized query and query type may be stored in the historical database 114.

Further, the historical database updating module 226 may update the historical database 114 based on the set of code output by the LLM in case the rating may be above a predefined threshold such as, but not limited to, 4 and 5, or the updated set of code input by the user in case the set of code generated by LLM is rated 3 or below 3. Further, the historical database updating module 228 may update the historical database 114 to also store the metadata of the user query and the optimized query and the set of code generated by the LLM or the set of updated code input by the user. In an embodiment, the database 114 may store metadata in a table separate from the historical data. Further, the historical database updating module 228 may update the historical database 114 periodically as a batch process. In an embodiment, the historical database updating module 228 may update the historical database 114 once every day.

Accordingly, the LLM tuning module 228 may tune the LLM based on the rating and/or the updated set of code corresponding to the set of code output by the LLM and the optimized query. In an exemplary embodiment, in order to tune the LLM, the LLM may not be trained fully, but instead delta weights may be added to certain layers. Accordingly, the tuning of the LLM may make the LLM smarter over time to generate better outputs. In an embodiment, the LLM may be tuned using methodology such as, but not limited to, LORA/QLORA, etc.

Accordingly, once the historical database 114 is updated, the LLM tuning module 226 may tune the LLM based on the rating and/or the updated set of code corresponding to the set of code output by the LLM and the optimized query periodically for example once every day.

It should be noted that all such aforementioned modules 201-228 may be represented as a single module or a combination of different modules. Further, as will be appreciated by those skilled in the art, each of the modules 201-228 may reside, in whole or in parts, on one device or multiple devices in communication with each other. In some embodiments, each of the modules 201-228 may be implemented as dedicated hardware circuit comprising custom application-specific integrated circuit (ASIC) or gate arrays, off-the-shelf semiconductors such as logic chips, transistors, or other discrete components. Each of the modules 201-228 may also be implemented in a programmable hardware device such as a field programmable gate array (FGPA), programmable array logic, programmable logic device, and so forth. Alternatively, each of the modules 201-228 may be implemented in software for execution by various types of processors (e.g. processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for optimizing query input for generating codes using large language model. For example, the exemplary system 100 and the associated computing device 102 may optimize query input for generating codes by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 3:
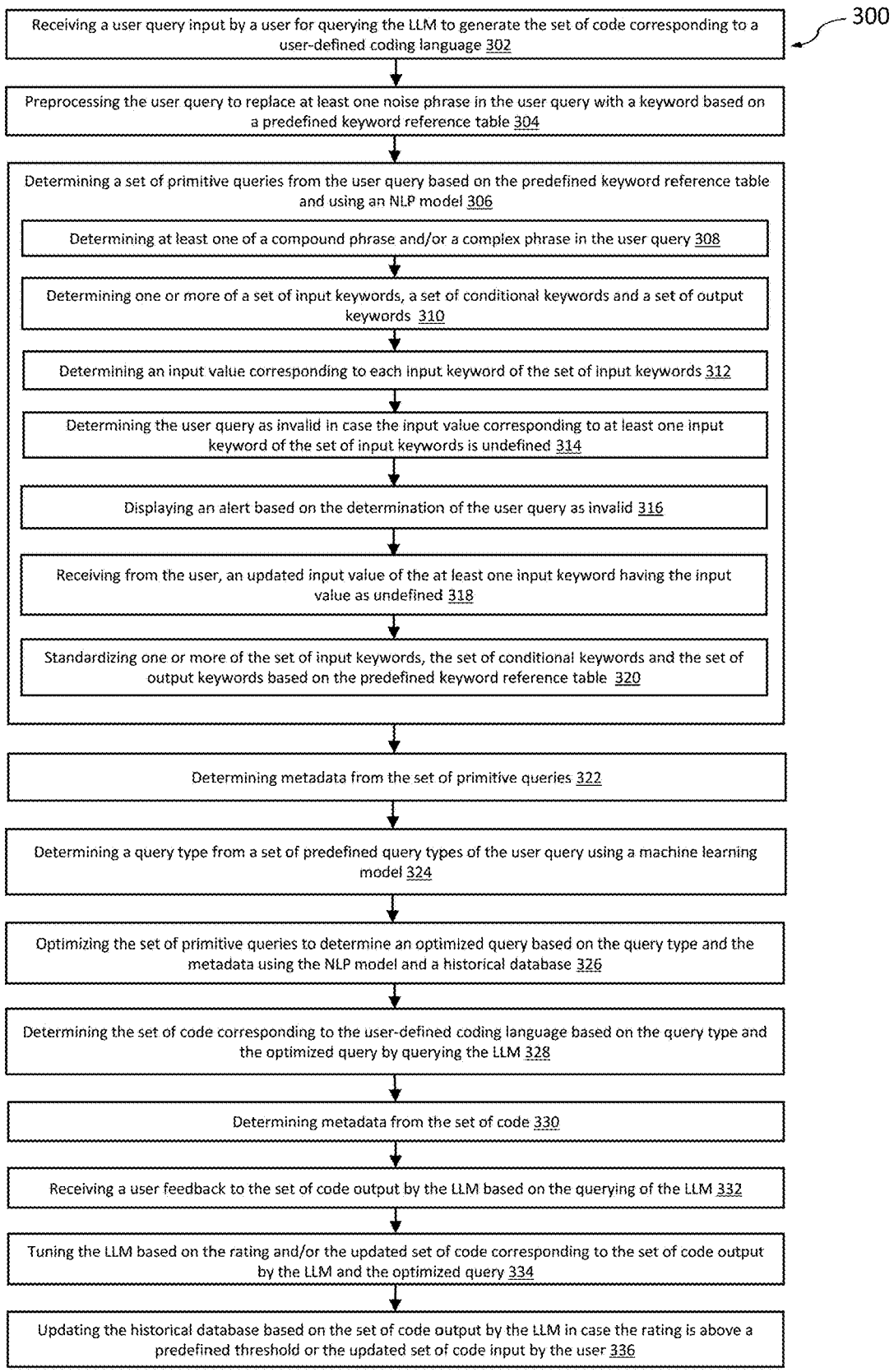
FIG. 3 illustrates a flow diagram of a method of optimizing query input for generating codes using large language models, in accordance with an embodiment of present disclosure.

Referring now to FIG. 3, a flow diagram of a method of optimizing query input for generating codes using large language models is illustrated, in accordance with an embodiment of present disclosure. In an embodiment, method 300 may include a plurality of steps that may be performed by the processor 104 to determine a compression embedding.

FIG. 3 is explained in conjunction with FIGS. 1 and 2. Each step of the method 300 may be executed by various modules of the computing device 102.

At step 302, a user query input by a user may be received for querying the LLM to generate the set of code corresponding to a user-defined coding language. In an embodiment, the user query may be, but is not limited to, in a form of statement. In an embodiment, examples of the LLM may include, but are not limited to, zephyr, code LLAMA, GPT, etc.

Further, at step 304, one or more noise phrases in the user query based on a predefined keyword reference table may be determined and replaced with a corresponding reference phases based on a lookup of each of the one or more noise phrases in the predefined keyword reference table. In an embodiment, the predefined keyword reference table may include a set of noise phrases and a corresponding reference phrase. Further, at step 306, a set of primitive queries from the user query may be determined using an NLP model. In an embodiment, to determine the set of primitive queries, at sub-step 308, at least one of a compound phrase and/or a complex phrase in the user query may be determined. Further at sub-step 310, one or more of a set of input keywords, a set of conditional keywords and a set of output keywords may be determined. Further at sub-step 312, an input value corresponding to each input keyword of the set of input keywords may be determined. Further at sub-step 314, the user query may be determined as invalid in case the input value corresponding to at least one input keyword of the set of input keywords may be undefined. Further at sub-step 316, an alert may be displayed based on the determination of the user query as invalid. Further at sub-step 318, an updated input value of the at least one input keyword that may have the input value as undefined may be received from the user. Further at sub-step 320, one or more of the set of input keywords, the set of conditional keywords and the set of output keywords may be standardized based on the predefined keyword reference table. In an embodiment, the standardization may be based on a look up of each word or phrase of the user query in the predefined keyword reference table to replace with standard phrases. In an embodiment, the standard phrases may be defined based on domain or programming language.

Further, at step 322, metadata from the set of primitive queries may be determined. In an embodiment, the metadata may include a number of input keywords in the set of input keywords, a number of conditional keywords in the set of conditional keywords, a number of lines of code, and/or a number of for loops, etc.

Further, at step 324, a query type from a set of predefined query types of the user query may be determined using a machine learning model. In an embodiment, the machine learning model may be trained to classify the user query as one of the set of predefined query types. In an embodiment, the set of predefined query types may include, but are not limited to, generated knowledge prompting, chain of thoughts, and priming. In an embodiment, the machine learning model may be a classification model. In an embodiment, the classification model may include, but is not limited to, decision trees, random forest, K-nearest neighbors (KNN), support vector machines (SVM), etc.

Further, at step 326, the set of primitive queries may be optimized to determine an optimized query based on the query type and the metadata using the NLP model and the historical data saved on the historical database 114. In an embodiment, the historical data may include a plurality of historical query-outputs corresponding to each of a plurality of historical queries and corresponding metadata of the plurality of historical query-outputs and the plurality of historical queries. In an embodiment, the optimized query based on the query type may be determined based on performing an action related to the query type.

Further, at step 328, the set of code corresponding to the user-defined coding language may be determined based on the query type and the optimized query by querying the LLM. Further, at step 330, metadata may be determined from the set of code. In an embodiment, the metadata may include, but is not limited to, a number of lines of code, and/or a number of for loops. Further, the database 114 may be updated to save the metadata periodically such as once daily such as at night or when network traffic is below a predefined threshold traffic.

Further, at step 332, a user feedback may be received to the set of code output by the LLM based on the querying of the LLM. In an embodiment, the user feedback may include a user rating on a scale of 0-5 with 0 being poor and 5 being good.

Further, at step 334, the LLM may be tuned based on the rating and/or the updated set of code corresponding to the set of code output by the LLM and the optimized query.

Further, at step 336, the historical database 114 may be updated based on the set of code output by the LLM in case the rating may be above a predefined threshold or the updated set of code input by the user. In an embodiment, the historical database 114 may also store the metadata of the user query and the optimized query and the set of code generated by the LLM or the set of updated code input by the user. In an embodiment, the database 114 may store metadata in a table separate from the historical data. Further, the historical database 114 may be updated periodically such as once daily such as at night or when network traffic is below a predefined threshold traffic.

In some embodiment, the preprocessed user query may be searched in the historical database 114 by comparing the preprocessed user query input with historical data saved in the historical database 114.

Further, the set of code corresponding to the preprocessed user query input may be determined by comparing the preprocessed user query input with the historical data saved in the historical database 114.

In an embodiment, the computing device 102 may determine the set of code corresponding to the user query based on the historical data, if in case there is a match between the preprocessed user query and the historical user queries saved in the historical database 114.

Figure 4:
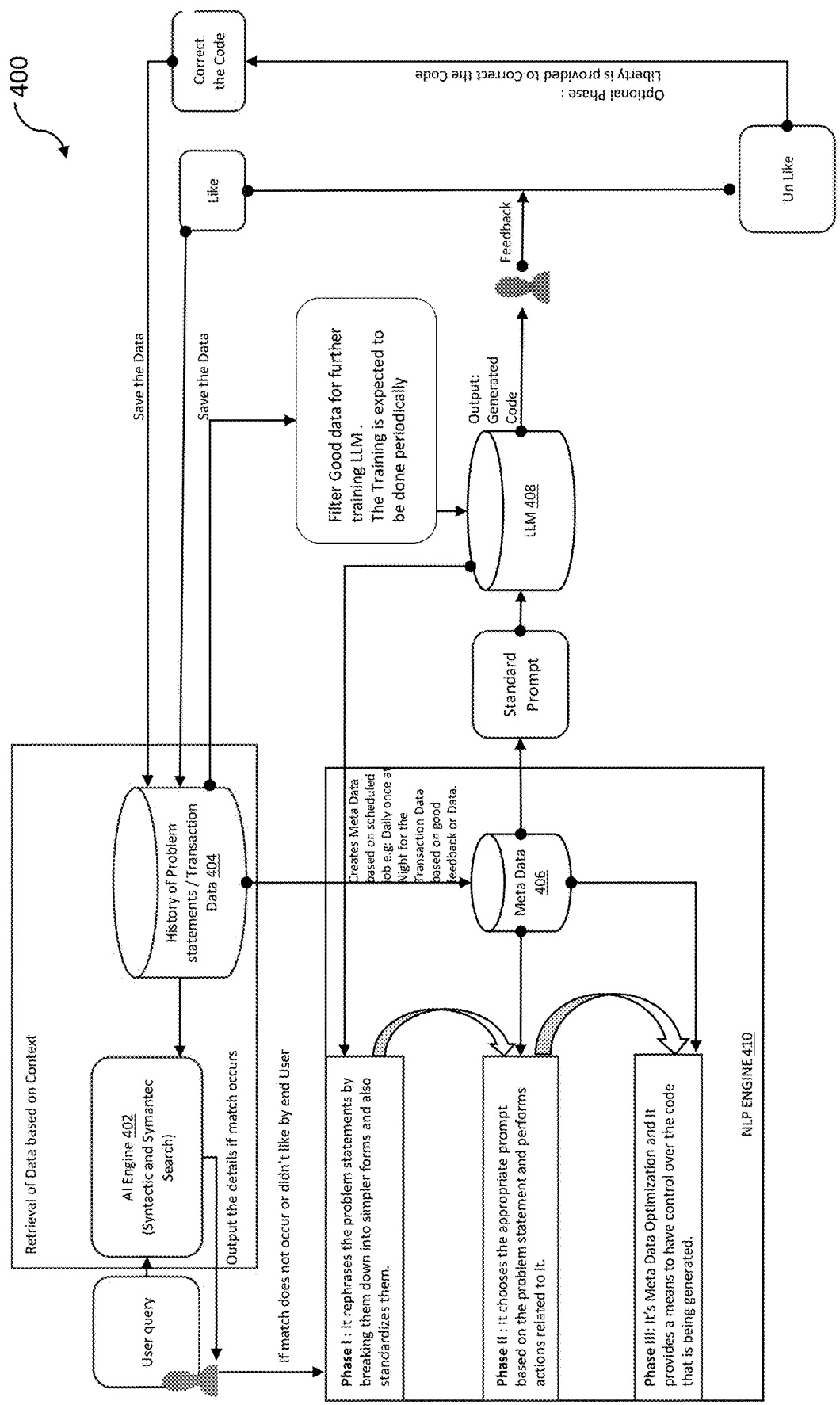
FIG. 4 illustrates an architecture diagram for optimizing query input for generating codes using large language models, in accordance with an embodiment of present disclosure.

Referring now to FIG. 4, an architecture diagram 400 for optimizing query input for generating codes using large language models is illustrated, in accordance with and embodiment of present disclosure.

FIG. 4 is explained in conjunction with FIGS. 1 and 2. As described earlier, a user query may be received by an AI engine 402. Further, one or more noise phrases in the user query based on a predefined keyword reference table may be determined and replaced with a corresponding reference phrase. In an embodiment, each of the one or more noise phrases in the predefined keyword reference table may be looked up in the user query one by one. In case any of the noise phrase is found in the user query it may be replaced with a corresponding reference phrase for the found noise phrase. In some embodiments, the preprocessed user query may be searched in the historical database 404 by comparing the preprocessed user query input with the historical data saved in the historical database 404. Further, the set of code corresponding to the preprocessed user query input may be determined by comparing the preprocessed user query input with the historical data saved in the historical database 404. In an embodiment, a set of code corresponding to the preprocessed user query may be determined based on a match of the preprocessed query with each of the plurality of historical queries. It is to be noted, a set of code determined may correspond to the historical set of code determined based on the matching historical query. Further, the match may be successful based on if a percentage level of match between the preprocessed query and one of the historical queries is above a predefined threshold such as, but not limited to, 97%.

If in case there is no match between the preprocessed user query and the historical user queries, a set of primitive queries from the user query may be determined using an NLP engine 410. Further, metadata from the set of primitive queries may be determined at stored in metadata database 406. Further, a query type from a set of predefined query types of the user query may be determined using a machine learning model from the pre-processed user query. Further, the set of primitive queries may be optimized to determine an optimized query based on the query type and the metadata using the NLP engine 410.

Further, the set of code corresponding to the user-defined coding language may be determined based on the query type and the optimized query by querying the LLM 408. Further, metadata may be determined from the set of code and saved in the metadata database 406 periodically such as, but not limited to, once daily. In an embodiment, the metadata may include, but is not limited to, a number of lines of code, and/or a number of for loops, etc.

Further, a user feedback may be received for the set of code output by the LLM 408 based on the querying of the LLM 408. In an embodiment, the user feedback may include a user rating on a scale of 0-5 with 0 being poor and 5 being good. Further, the historical database 404 may be updated based on the set of code output by the LLM 408 in case the rating is above a predefined threshold or the updated set of code is input by the user. In an embodiment, the metadata database 406 may also store the metadata of the user query and the optimized query and the set of code generated by the LLM 408 or the set of updated code input by the user. In an embodiment, the historical database 404 may store the user query and the optimized query and the set of code generated by the LLM 408 or the set of updated code input by the user. In an embodiment, the metadata stored in the metadata database 406 corresponding to the user query and the optimized query and the set of code generated by the LLM 408 or the set of updated code input by the user may be associated to the corresponding data in the historical database 404. Further, the LLM 408 may be tuned based on the rating and/or the updated set of code corresponding to the set of code output by the LLM 408 and the optimized query.

In an embodiment, challenges for querying LLMs for generating consistent codes may include but are not limited to a poorly phrased prompt can yield unhelpful and non-consistent output functional codes, underscoring the significance of precision in the programming process. Creating functional code that meets specific requirements has historically been a time-consuming process for developers, often taking anywhere from a few hours to a week to develop PLC (Programmable Logic Controller) code. Additionally, making coding more accessible to a wider audience has been a persistent challenge, hindering efforts to bridge the skills gap and involve a more diverse group of individuals in programming. Consistency in code development poses another challenge, as each developer tends to employ their own unique patterns and approaches, leading to potential difficulties in maintenance and troubleshooting. Human errors in coding further intensify the issue, potentially resulting in unreliable code that can lead to system failures and malfunctions. Generating PLC code for Structured Text Language (STL) and Ladder Logic introduces additional complexities due to factors such as complex statements, compound statements, and non-standardized data. These difficulties make the task of developing PLC code for these languages challenging, requiring a careful approach to ensure accurate and reliable outcomes.

Thus, the disclosed method and system tries to overcome the technical problem of querying LLMs for generating consistent codes through a method and system of optimizing query input for generating codes using large language models against such challenges. In an embodiment, advantages of the disclosed method and system may include but is not limited to helps in analyzing and understanding the pattern of prompts, takes action based on the identified patterns without requiring human intervention during runtime, particularly useful for generating code quickly, reducing the time needed compared to human coding efforts, over time, the accuracy of the tool increases, contributing to a delta increase in performance, engineers can use pre-established templates or configurations to swiftly generate Programmable Logic Controller (PLC) code, this allows engineers to allocate more time to design and refine control logic Instead of being consumed by lengthy coding processes.

As will be appreciated by those skilled in the art, the techniques described in the various embodiments discussed above are not routine, or conventional, or well-understood in the art. The techniques discussed above provide for optimizing queries for generating codes using large language models.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps bring an improvement in the functioning of the device itself as the claimed steps provide a technical solution to a technical problem.

The specification has described method and system for optimizing query input for generating codes using large language models. The illustrated steps are set out to explain the exemplary embodiments shown, and it should be anticipated that ongoing technological development will change the manner in which particular functions are performed. These examples are presented herein for purpose of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope of disclosed embodiments being indicated by the following claims.

What is claimed is:

1. A method of optimizing query input for generating a set of code using a large language model (LLM), the method comprising:
   receiving, by a processor, a user query input by a user for querying the LLM to generate the set of code corresponding to a user-defined coding language;
   determining, by the processor, a set of primitive queries from the user query using an NLP model,
      wherein the set of primitive queries are determined by determining:
         at least one of: a compound phrase and/or a complex phrase in the user query, and
         one or more of: a set of input keywords, a set of conditional keywords and a set of output keywords;
   determining, by the processor, metadata from the set of primitive queries,
      wherein the metadata comprises a number of input keywords in the set of input keywords, a number of conditional keywords in the set of conditional keywords, a number of lines of code, and/or a number of for loops;
   determining, by the processor, a query type from a set of predefined query types of the user query using a machine learning model,
      wherein the machine learning model is trained to classify the user query as one of the set of predefined query types;
   optimizing, by the processor, the set of primitive queries to determine an optimized query based on the query type and the metadata using the NLP model and a historical database,
      wherein the historical database comprises a plurality of historical query-outputs corresponding to each of a plurality of historical queries and corresponding metadata of the plurality of historical query-outputs and the plurality of historical queries; and
   determining, by the processor, the set of code corresponding to the user-defined coding language based on the query type and the optimized query by querying the LLM.

2. The method of claim 1, comprising:
   determining, by the processor, an input value corresponding to each input keyword of the set of input keywords;
   determining, by the processor, the user query as invalid in case the input value corresponding to at least one input keyword of the set of input keywords is undefined;
   displaying, by the processor, an alert based on the determination of the user query as invalid; and
   receiving, by the processor, from the user, an updated input value of the at least one input keyword having the input value as undefined.

3. The method of claim 1, wherein the set of predefined query types comprises generated knowledge prompting, chain of thoughts, and priming.

4. The method of claim 1, comprising: preprocessing, by the processor, the user query by:
   determining, by the processor, one or more noise phrases in the user query based on a predefined keyword reference table,
      wherein the predefined keyword reference table comprises a set of noise phrases and a corresponding reference phrase; and
   replacing, by the processor, the one or more noise phases in the user query with a corresponding reference phases based on a lookup of each of the one or more noise phrases in the predefined keyword reference table.

5. The method of claim 4, wherein the determination of the set of primitive queries comprises:
   standardizing, by the processor, one or more of the set of input keywords, the set of conditional keywords and the set of output keywords based on the predefined keyword reference table.

6. The method of claim 1, comprising:
   receiving, by the processor, a user feedback corresponding to the set of code output by the LLM based on the querying of the LLM, wherein the user feedback comprises a rating and/or an updated set of code input by user corresponding to the set of code output by the LLM; and tuning, by the processor, the LLM based on the rating and/or the updated set of code corresponding to the set of code output by the LLM and the optimized query.

7. The method of claim 6, comprises:

updating, by the processor, the historical database based on the set of code output by the LLM in case the rating is above a predefined threshold or the updated set of code input by the user.

8. A system of optimizing query input for generating a set of code using a large language model (LLM), comprising:

a processor; and a memory communicably coupled to the processor, wherein the memory stores processor-executable instructions, which, on execution, cause the processor to:

receive a user query input by a user for querying the LLM to generate the set of code corresponding to a user-defined coding language;

determine a set of primitive queries from the user query using an NLP model,
wherein the set of primitive queries are determined by determining:
at least one of: a compound phrase and/or a complex phrase in the user query, and
one or more of: a set of input keywords, a set of conditional keywords and a set of output keywords;

determine metadata from the set of primitive queries, wherein the metadata comprises a number of input keywords in the set of input keywords, a number of conditional keywords in the set of conditional keywords, a number of lines of code, and/or a number of for loops;

determine a query type from a set of predefined query types of the user query using a machine learning model,
wherein the machine learning model is trained to classify the user query as one of the set of predefined query types;

optimize the set of primitive queries to determine an optimized query based on the query type and the metadata using the NLP model and a historical database,
wherein the historical database comprises a plurality of historical query-outputs corresponding to each of a plurality of historical queries and corresponding metadata of the plurality of historical query-outputs and the plurality of historical queries; and determine the set of code corresponding to the user-defined coding language based on the query type and the optimized query by querying the LLM.

9. The system of claim 8, wherein the processor is configured to:

determine an input value corresponding to each input keyword of the set of input keywords;

determine the user query as invalid in case the input value corresponding to at least one input keyword of the set of input keywords is undefined;

display an alert based on the determination of the user query as invalid; and receive from the user, an updated input value of the at least one input keyword having the input value as undefined.

10. The system of claim 8, wherein the set of predefined query types comprises generated knowledge prompting, chain of thoughts, and priming.

11. The system of claim 8, wherein the processor is configured to:

determine one or more noise phrases in the user query based on a predefined keyword reference table,
wherein the predefined keyword reference table comprises a set of noise phrases and a corresponding reference phrase; and replace the one or more noise phases in the user query with a corresponding reference phases based on a lookup of each of the one or more noise phrases in the predefined keyword reference table.

12. The system of claim 8, wherein to determine the set of primitive queries, the processor is configurable to:

standardize one or more of the set of input keywords, the set of conditional keywords and the set of output keywords based on the predefined keyword reference table.

13. The system of claim 8, wherein the processor is configured to:

receive a user feedback corresponding to the set of code output by the LLM based on the querying of the LLM, wherein the user feedback comprises a rating and/or an updated set of code input by user corresponding to the set of code output by the LLM; and tune the LLM based on the rating and/or the updated set of code corresponding to the set of code output by the LLM and the optimized query.

14. The system of claim 13, wherein the processor is configured to:

update the historical database based on the set of code output by the LLM in case the rating is above a predefined threshold or the updated set of code input by the user.

15. A non-transitory computer-readable medium storing computer-executable instructions for generating a set of code using a large language model (LLM), the computer-executable instructions configured for:

receiving a user query input by a user for querying the LLM to generate the set of code corresponding to a user-defined coding language;

determining a set of primitive queries from the user query using an NLP model,
wherein the set of primitive queries are determined by determining:
at least one of: a compound phrase and/or a complex phrase in the user query, and
one or more of: a set of input keywords, a set of conditional keywords and a set of output keywords;

determining metadata from the set of primitive queries, wherein the metadata comprises a number of input keywords in the set of input keywords, a number of conditional keywords in the set of conditional keywords, a number of lines of code, and/or a number of for loops;

determining a query type from a set of predefined query types of the user query using a machine learning model,
wherein the machine learning model is trained to classify the user query as one of the set of predefined query types;

optimizing the set of primitive queries to determine an optimized query based on the query type and the metadata using the NLP model and a historical database, wherein the historical database comprises a plurality of historical query-outputs corresponding to each of a plurality of historical queries and corresponding metadata of the plurality of historical query-outputs and the plurality of historical queries; and determining the set of code corresponding to the user-defined coding language based on the query type and the optimized query by querying the LLM.

16. The non-transitory computer-readable medium of claim 15, wherein the computer-executable instructions are further configured for:
    determining an input value corresponding to each input keyword of the set of input keywords;
    determining the user query as invalid in case the input value corresponding to at least one input keyword of the set of input keywords is undefined;
    displaying an alert based on the determination of the user query as invalid; and
    receiving from the user, an updated input value of the at least one input keyword having the input value as undefined.

17. The non-transitory computer-readable medium of claim 15, wherein the set of predefined query types comprises generated knowledge prompting, chain of thoughts, and priming.

18. The non-transitory computer-readable medium of claim 15, wherein the computer-executable instructions are further configured for:

determining one or more noise phrases in the user query based on a predefined keyword reference table,
    wherein the predefined keyword reference table comprises a set of noise phrases and a corresponding reference phrase; and
replacing the one or more noise phases in the user query with a corresponding reference phases based on a lookup of each of the one or more noise phrases in the predefined keyword reference table.

19. The non-transitory computer-readable medium of claim 18, wherein to determine the set of primitive queries, the computer-executable instructions are configured for:
    standardizing one or more of the set of input keywords, the set of conditional keywords and the set of output keywords based on the predefined keyword reference table.

20. The non-transitory computer-readable medium of claim 15, wherein the computer-executable instructions are further configured for:
    receiving, by the processor, a user feedback corresponding to the set of code output by the LLM based on the querying of the LLM,
        wherein the user feedback comprises a rating and/or an updated set of code input by user corresponding to the set of code output by the LLM; and
    tuning, by the processor, the LLM based on the rating and/or the updated set of code corresponding to the set of code output by the LLM and the optimized query.

* * * * *